Patented June 2, 1936

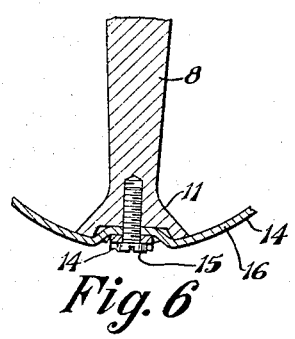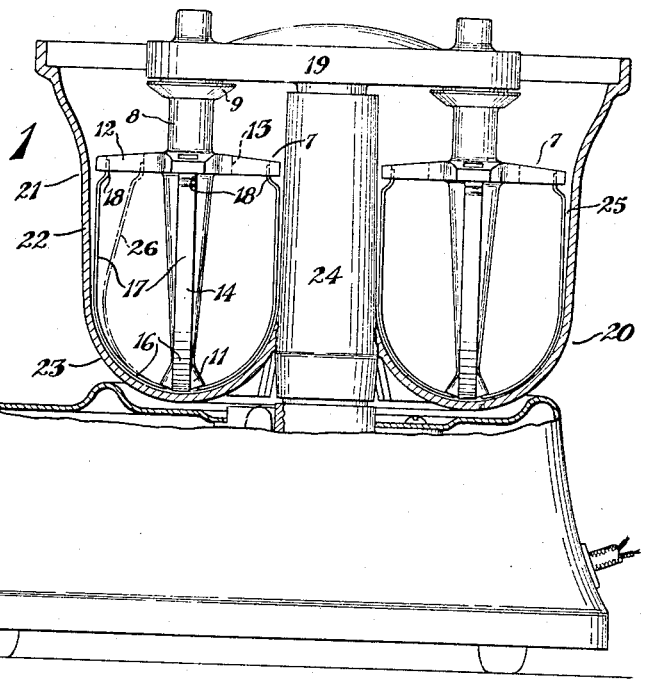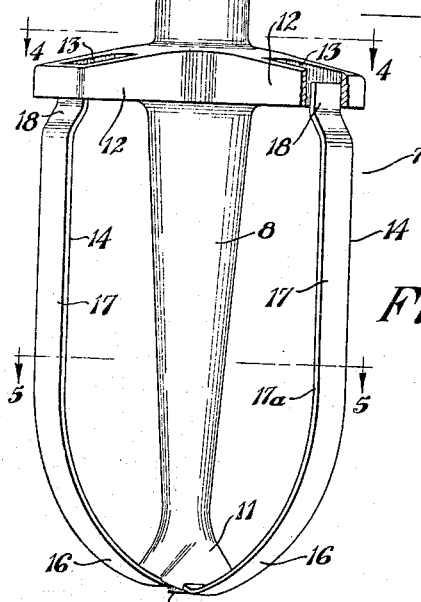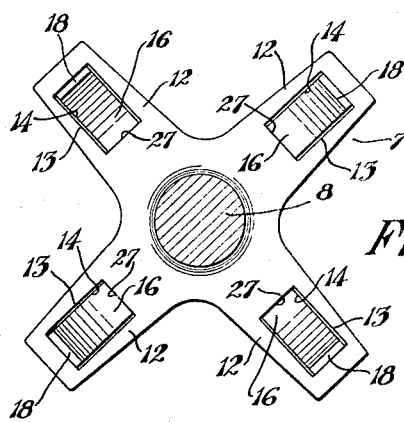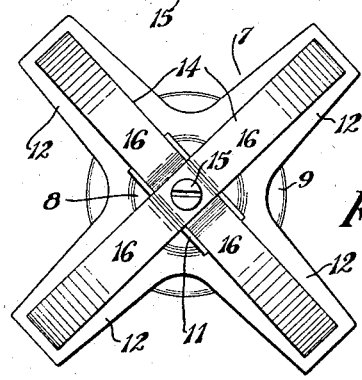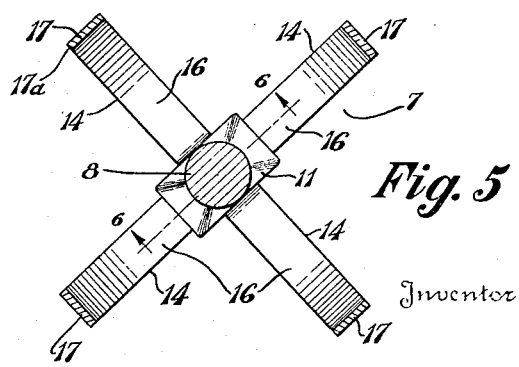

2,042,791

UNITED STATES PATENT OFFICE 2,042,791

BEATER

Eugene F. Martinet, Cleveland, Ohio, assignor to The P. A. Geier Company, Cleveland, Ohio, a corporation of Ohio Application April 3, 1934, Serial No. 718,807

10 Claims. (Cl. 259—102)

The invention relates to a food working tool or beater, and more particularly to an improved type of rotary beater construction especially adapted for mixing, beating, whipping or blending food mixtures and ingredients in a mixing bowl having an annular outer wall, a toroidal shaped bottom wall and a central tubular sleeve, wherein one or more beaters are rotated and small clearances are ordinarily desired to be maintained between the beater blades and the outer, bottom and sleeve walls of the mixing bowl, such as shown in my prior copending application, Serial No. 692,483; and the construction shown, described and claimed herein is an improvement upon the beater element construction shown, described and claimed in my prior application.

My prior beater construction admirably serves the purpose for which it was designed, namely, to accomplish a mixing, beating, whipping or blending operation with one style of beater only. However, my prior beater construction is an all-cast metal construction and certain difficulties have been encountered when the same is improperly used, or when such beaters are used to blend or beat a mixture, which includes among other ingredients, certain particular ingredients.

Thus, when brown sugar, nuts, candied fruit or other similar food articles are contained as ingredients of a batter for cakes, fruit cakes and the like, it has been discovered that the hard, caked or rock-like particles of the brown sugar, or large pieces of nut meats, or large pieces of candied fruit may be pinched in the small clearance space between the beater blades and the bowl walls.

Under these circumstances, something must give way or yield, and due to the fact that the bowl is extremely rigid, the beater blades therefore frequently give way and become bent or sprung. When the beater is thus sprung out of round or off center, the blades thereof strike the bowl walls, because there is no resilience to the cast metal structure to cause the blades to spring back to normal shape if they have once been bent or sprung.

Moreover, in connection with washing or putting the parts of a mixer away in a cupboard, an operator may accidentally drop a beater element on a sink, floor or other hard surface, with the result that the thin cast metal beater bars may become bent, sprung or broken.

Likewise, an operator of a food mixer frequently forgets that spoons or other similar articles must not be used in a bowl when a power driven beater is being operated therein, and it therefore frequently happens that spoons or other similar articles are accidentally dropped into the mixing bowl and become entangled with the rotating power driven beater elements, causing bending, breaking or other damage to the spoon, beater elements and/or mixing bowl.

It is therefore a principal object of the present invention to provide a beater construction, which cannot become damaged when used to mix batters including any desired food ingredients, and which cannot become damaged or cause injury when the food mixer or beater is accidentally or improperly handled or operated.

More particularly, it is an object of the present invention to provide a beater which cannot be damaged or permanently sprung or bent when used in mixing batters including brown sugar, nut meats, candied fruit and the like in a bowl in which close clearances are maintained between the bowl walls and the path of the beater blades.

It is a further object of the present invention to provide a beater which cannot become damaged or permanently bent or sprung if the same is accidentally dropped upon a hard object or surface.

Moreover, it is an object of the present invention to provide a beater which ordinarily will not become damaged or broken if a spoon or other similar article is accidentally dropped into a mixing bowl and becomes entangled with the beater during a power driven operation of the beater therein.

I have likewise discovered that if a beater bar presents a relatively wide surface to the food material through which it is rotating, there may be a tendency to splash, if the material or mixture is thin; which splashing does not occur if the beater bar presents a thin edge which cuts into or through the mixture. Moreover, when cream is being whipped, I have discovered that a beater bar having a wide surface presented to the cream in passing therethrough seems to expel air out of the cream, rather than to introduce air into the cream, which is the desired function or result of a cream whipping operation.

It is therefore a further object of the present invention to provide an improved beater which includes one or more strong beater bars of relatively small cross section, which present a thin edge to the material through which the beater rotates for avoiding splashing and preventing a deaerating of materials being mixed, beaten or whipped.

And finally, it is an object of the present invention to provide an improved beater construction, which avoids the difficulties and accomplishes the objectives described above, and which is easy and inexpensive to manufacture and service.

These and other objects may be obtained by the beater constructions, a preferred embodiment of which is shown in the drawing, and is hereinafter described in detail and claimed, which may be stated in general terms as including a substantially rigid shaft portion, a flat spring metal beater blade secured to one end of the shaft portion, said blade extending away from and in spaced relation to the shaft portion, and said blade having its free end confined for restricted movement radially of the shaft portion.

In the drawing,

Figure 1 is a general view of a food preparing device with certain parts broken away or removed and in section, showing the improved beater;

Fig. 2 is an enlarged side elevation of the improved beater shown in Fig. 1 rotated 45 degrees from the position shown in Fig. 1;

Fig. 3 is a bottom plan view of the beater shown in Fig. 2;

Fig. 4 is a top plan sectional view of the improved beater taken on the line 4—4, Fig. 2;

Fig. 5 is a plan sectional view through the beater blades of the improved beater taken on the line 5—5, Fig. 2; and Fig. 6 is a fragmentary sectional view showing the manner in which the improved spring beater blades are connected to the beater shaft, taken on the line 6—6, Fig. 5.

Similar numerals refer to similar parts throughout the various figures of the drawing.

The improved beater is generally indicated at 7 in the drawing and includes a preferably rigid, cast metal shaft portion 8, a collar portion 9 adjacent one end of the shaft, and a gear 10 above the collar 9. The other end of the shaft is preferably provided with a flared boss 11, and a plurality of lugs 12 extend radially outwardly from the shaft 8 between the collar 9 and boss 11.

Each of the lugs 12 is provided with an elongated slot 13, and a plurality of flat spring-metal beater blades 14 are rigidly secured to the boss 11 of the beater, preferably by a removable screw 15.

Each beater blade 14 is preferably generally U-shaped and is made preferably of spring strip steel. The lower rounded or curved central portion 16 of each beater blade 14 is secured by the screw 15 to the boss 11, so that the beater blade extends upwardly away from and in spaced relation to the shaft portion with its normally vertical straight leg portions 17 extending vertically upward parallel to the shaft 8 and terminating in offset free ends 18. The offset free ends 18 are spaced from the shaft 8 at all times and confined for restricted movement radially to and away from the shaft portion within the elongated slots 13, whereby the beater blades 14 normally have the position shown in full lines in the drawing. As shown in the drawing, the slots 13 are of such width as to prevent any substantial movement of the free ends 18 of the blades in a direction lateral to the restricted radial movement thereof, at any time during said restricted radial movement. The blades likewise are thin in cross section radially of the shaft and elongated in cross section circumferentially of the shaft as best shown in Fig. 5.

A plurality of beaters 7 may be mounted for rotative movement on a beater holder 19 generally indicated in Fig. 1, which forms part of a food mixer generally indicated at 20; and a detailed description of the food mixer 20 is not necessary, since it is the subject matter of my copending application, Serial No. 692,483 and does not form part of the present invention, which relates more particularly to the beaters 7.

However, the food mixer 20 is provided with a mixing bowl 21 having an outer annular wall 22, which merges into a lower toroidal shaped bottom wall 23 that terminates inwardly and upwardly in a vertically extending central tubular sleeve 24, which is telescoped over a drive assembly of the food mixer 20.

When the food mixer 20 is used for carrying out a mixing, beating or whipping operation, it is desirable to maintain very small clearances between the path of the beater blades 14, and the bowl walls 22, 23, and 24, as indicated at 25 in Fig. 1 of the drawing.

However, should a caked particle of brown sugar, or a large piece of a nut meat, or a large piece of candied fruit be moved so as to attempt to pass between beater blade 14 and bowl wall 25 in the small clearance space 25, the beater blade being of spring steel, may be sprung, without damage, to a position such as shown at 26 by dot-dash lines of Fig. 1, wherein the free end 18 of the beater blade engages the inner end 27 of the slot 13 within which it is confined. Thus, no damage is done to the beaters or mixing bowl by using the same for mixing batters which may include brown sugar, nuts, candied fruit or the like.

Moreover, if one of the improved beaters 7 is accidentally dropped on the floor, no damage is done to the same since the shaft 8 is heavy enough to withstand any shock which it may sustain upon dropping, or if the beater lands on one of the spring metal beater blades 14, the resilience of the same will absorb the shock.

Moreover, if a spoon is accidentally dropped into the mixing bowl 21 of the food mixer 20, while beaters 7 are rotating therein, no damage is ordinarily done to the beaters 7 because the resilience of the spring metal beater blades 14 normally permit such a spoon to pass between the beater and the bowl walls until operation of the mixer may be stopped by the operator.

The beater blades 14, in being made of spring steel, are very strong. Moreover, the beater blades 14, in presenting an edge portion 17a to the material through which the beater rotates, cut through the material without a tendency to splash the mixture out of the mixing bowl 21; and in whipping cream, a maximum amount of air is introduced therein by the improved beater blade construction.

Thus, the beater blades, in being made of spring steel and mounted so that their free ends are confined for restricted movement radially of the shaft portion, may yield to hard objects. They likewise provide great strength with a small or thin strip section of metal. Also, the strip metal form of beater blade cuts through rather than pushes through material being mixed; and finally, the improved beater construction provides for simple and easy removal and servicing of the beater blades 14 by merely removing the screw 15.

It is not intended to limit the scope of the present invention to beaters which are used only in connection with bowls such as shown in the drawing; because the improved beaters, although designed especially for and having important advantages when used in connection with such bowls, may equally be used advantageously in other types of bowls.

I claim:—

1. A beater including a shaft, a spring metal blade having a curved portion secured to one end of the shaft and having a straight portion normally extending parallel to the shaft terminating in a free end spaced from the shaft, and means confining the free end for restricted movement to and away from the shaft.

2. A beater including a shaft having a lug extending outwardly therefrom, said lug being provided with an elongated slot, a spring metal blade rigidly secured to one end of the shaft, and the blade having a free end confined for restricted movement within the slot.

3. A beater including a shaft, a U-shaped spring metal blade having a curved portion and leg portions terminating in free ends, means securing the curved portion of the blade to one end of the shaft, and means confining the free ends of the blade for restricted movement to and away from the shaft, said free ends being spaced from the shaft at all times.

4. A beater including a shaft, a plurality of U-shaped spring metal blades, each blade including a curved portion and leg portions terminating in free ends, means securing the curved portions of the blades to the shaft, and means confining the free ends of the blades for restricted movement to and away from the shaft, the free ends of each of said blades being spaced from the shaft at all times.

5. A beater including a shaft, a plurality of U-shaped spring metal blades, removable means conjointly securing said blades to one end of the shaft, each of the blades having free ends, and means confining the free ends of the blades for restricted movement to and away from the shaft, the free ends of each of said blades being spaced from the shaft at all times.

6. A beater including a shaft, a plurality of U-shaped spring metal blades secured at one place only intermediate their ends to the shaft, and means projecting from the shaft confining the blades for restricted movement to and away from the shaft.

7. In a food mixer, a mixing bowl having an outer annular wall, a lower toroidal shaped wall, and a central tubular sleeve; a beater mounted for rotation within the bowl having a spring metal blade conforming in contour to the contour of the bowl walls and sleeve and adapted for rotation in a path closely adjacent to said bowl walls and sleeve; means mounting said blades for resilient movement to and away from the bowl walls and sleeve; and means on said beater limiting the said resilient movement of said blades and preventing movement thereof lateral to and during said resilient movement.

8. A beater including a shaft, a spring metal blade rigidly secured to the shaft, the blade having a free end, and means on the shaft confining the free end for restricted movement to and away from the shaft and for preventing movement of said free end lateral to said restricted movement.

9. A beater including a shaft, a resilient strip metal blade rigidly secured to one end of the shaft, the blade having a free end, and means on and projecting from the shaft confining the free end for restricted movement radially of the shaft and for preventing movement of said free end lateral to said restricted movement.

10. A beater including a shaft, a resilient strip metal blade secured to the shaft, the blade being thin radially of the shaft and elongated circumferentially of the shaft and having a free end, and means on the shaft confining the free end for restricted movement to and away from the shaft and for preventing movement of said free end lateral to said restricted movement.

EUGENE F. MARTINET.